United States Patent [19]
Agari

[11] Patent Number: 5,678,928
[45] Date of Patent: Oct. 21, 1997

[54] LINEAR MOTION ROLLING GUIDE UNIT

[75] Inventor: Norimasa Agari, Seki, Japan

[73] Assignee: Nippon Thompson Co., Ltd., Tokyo

[21] Appl. No.: 607,660

[22] Filed: Feb. 27, 1996

[30]     Foreign Application Priority Data

Mar. 8, 1995 [JP] Japan ..................... 7-074711

[51] Int. Cl.⁶ ............................................. F16C 29/06
[52] U.S. Cl. ........................................................ 384/45
[58] Field of Search ............................ 384/43, 44, 45; 464/168

[56]            References Cited

U.S. PATENT DOCUMENTS

| | | | |
|---|---|---|---|
| 4,376,556 | 3/1983 | Bergman et al. | 384/44 |
| 4,547,024 | 10/1985 | Teramachi | 384/45 |
| 4,730,945 | 3/1988 | Luther | 384/44 |
| 4,778,284 | 10/1988 | Teremachi | 384/45 |

FOREIGN PATENT DOCUMENTS 5-209616  8/1993  Japan .

*Primary Examiner*—Lenard A. Footland
*Attorney, Agent, or Firm*—Browdy and Neimark

[57]            ABSTRACT

The linear motion rolling guide unit according to the present invention comprises a track rail provided with raceway grooves in both of longitudinally extending side surfaces thereof, and a slider saddled on and capable of being moved linearly and relatively to the track rail. A casing constituting the slider is provided with a flange formed integrally therewith and extending from the surface thereof which is on the opposite side of the raceway grooves. The flange has a fixing reference surface on a side portion thereof. A part to be fixed to the flange is provided with a fixing reference surface engageable with that of the flange. Since this linear motion rolling guide unit is thus constructed, the degree of freedom of designing the fixing structure for securing the part mentioned above to the slider can be improved.

10 Claims, 11 Drawing Sheets

LINEAR MOTION ROLLING GUIDE UNIT

BACKGROUND OF THE INVENTION

1. Field of the Invention

This invention relates to a linear motion rolling guide unit applied to a semiconductor manufacturing apparatus, a transfer apparatus, an industrial robot, an assembly robot and a machine tool, and having a slider saddled on and slided relatively to a track rail.

2. Description of the Prior Art

There is a known linear motion rolling guide unit shown in FIGS. 25 and 26. This linear motion rolling guide unit comprises a slider 1 saddled slidably on a track rail 2 provided with raceway grooves 4 in its longitudinal side surfaces 3. The track rail 2 is provided with mounting holes 23 and fixed on a mount base by inserting bolts into the same holes 23. The slider 1 can be slided relatively to the track rail 2, and has a casing 5 provided with raceway grooves 9 in the portions thereof which are opposed to the raceway grooves 4, rolling elements 7 fitted in spaces between the raceway grooves 4, 9 and capable of being moved relatively, and end caps 6 attached to both ends of the casing 5 in the sliding (longitudinal) direction. The casing 5 is provided in its upper wall with mounting holes 51 via which a member to be mounted, such as a table is fixed thereon.

Side seals 17 for achieving the sealing of clearances between the track rail 2 and slider 1 are attached to the end caps 6. In order to prevent the rolling elements 7 from falling from the casing 5, retainer bands 15 are secured to the slider 1 so as to enclose the rolling elements 7. The track rail 2 is provided with retainer band fitting grooves 16 along the raceway grooves 4 in the side surfaces 3. The retainer bands 15 are so disposed with respect to the casing 5 that the retainer bands extend along the raceway grooves 9 in the casing 5 and are fitted in the retainer band fitting grooves 16 in the track rail 2.

In order to seal both of the longitudinal side surfaces 3 of the casing 5 and track rail 2 and lower surfaces of the casing 5, lower seals 8 are provided on the casing 5. The slider 1 is placed in a saddled state on the track rail 2, and adapted to be slided freely via the rolling elements 7 recirculated along the raceway grooves 4 in the track rail 2.

The rolling elements 7 in load regions which roll along the raceway grooves 4 in the track rail 2 are guided into direction changing passages 11 formed in the end caps 6, and they are then moved into return passages 12 formed in upper portions of the casing 5 and in parallel with the raceway grooves 9, the rolling elements 7 being thus circulated limitlessly in an endless circulating passage. Owing to the rolling of the loaded rolling elements positioned between the raceway grooves 9 formed in the casing 5 and those 4 formed in the track rail 2, a linear relative motion is provided between the slider 1 and the track rail 2.

Conventional examples shown in FIGS. 15–24 will now be described, and, in order to describe them clearly, the parts identical with those shown in FIGS. 25 and 26 are designated by the same reference numerals.

A linear motion rolling guide unit of an upwardly fixing type shown in FIG. 15 is known, in which a table 13 is fixed to a slider 1. In this linear motion rolling guide unit, a track rail 2 is fixed to a mount base 14 by screws (fixing bolts) 19. The slider 1 is saddled on the track rail 2 for linear relative motion. A casing 5 of the slider 1 is provided with vertically extending fixing through holes 18. The table 13 is provided with fixing threaded holes 21. A fixing reference surface of the table 13 is brought into contact with that C on the upper side of the slider 1 with a fixing reference surface D on vertical sides of the slider 1 brought into contact with that of stepped portions 26 of the table 13, whereby the table 13 is set on the slider 1, the table 13 being then fixed to the slider 1 by inserting screws (fixing bolts) 20 into the fixing holes 18 in the casing 5 from the lower side thereof and driving the same screws 20 into the fixing threaded holes 21 in the table 13. For example, a linear motion rolling guide in which a table 13 is supported on track rails 2 via four sliders 1 is known (refer to, for example, Japanese Patent Laid-Open No. 209616/1993), in which a pair of track rails 2 are fixed in parallel with each other to a mount base 14, two sliders 1 being set on each track rail 2 to permit linear relative motion therebetween a table 13 being then fixed on the four sliders 1.

A downwardly fixing type linear motion rolling guide unit shown in FIG. 16 is known, in which a table 13 is fixed to a slider 1. In this linear motion rolling guide unit, fixing threaded holes 22 are formed in an upper surface of a casing 5 of the slider 1. In this linear motion rolling guide unit, a track rail 2 is fixed to a mount base 14 by screws (fixing bolts) 19, and the slider 1 is saddled on and slided relatively to the track rail 2, just as in the linear motion rolling guide unit shown in FIG. 15. The table 13 on the slider 1 is provided with vertically extending fixing holes 24. The casing 5 is provided with threaded holes 22. In the same manner as in the example shown in FIG. 15, the table 13 is set on the slider 1, and screws (fixing bolts) 20 are inserted into the fixing holes 24 in the table 13 from the upper side thereof, the screws 20 being then driven into the threaded holes 22, whereby the table 13 is fixed to the slider 1.

In recent years, a linear motion rolling guide unit has come to be applied to a semiconductor manufacturing apparatus, a small part transfer apparatus, an industrial robot, an assembly robot or a machine tool, and the use of a linear motion rolling guide unit having small dimensions, a high accuracy, a compact structure and a large load capacity, and, moreover, a compound type rolling guide unit capable of making complicated planar movements has been demanded.

In a conventional linear motion rolling guide unit, various troubles occur in operations for fixing additional parts, such as a table to a slider. When a table 13 is fixed to a slider 1 in, for example, a linear motion rolling guide unit shown in FIG. 17, in which a distance L between a mount base 14 and a lower end surface of a fixing hole 18 in a casing 5 is small, a bolt cannot be inserted into the fixing hole 18 in the casing 5 from the lower side thereof for fixing a table 13 to the slider 1, i.e., the table 13 cannot be fixed by using the slider of the type shown in FIG. 15. In such a case, the slider of the type shown in FIG. 16 is utilized, i.e., the table 13 is fixed to the casing 5 by inserting a screw 20 into a fixing hole 24 in the table 13 from the upper side of the table 13 and casing 5, and twisting round the screw 20 into a threaded hole 22 in the casing 5.

In order to fix a table to a casing with a high accuracy, it is necessary that the table also has a fixing reference surface D, and that the table 13 be provided with a stepped portion 26, with which the fixing reference surfaces C, D of the slider 1 should be engaged, as shown in FIGS. 15 and 16. However, the forming of the stepped portion 26 on the table requires a troublesome machining operation, and is difficult to be done with a high accuracy. When a slider is incorporated into a cross table, a head of a fixing bolt, i.e. a screw obstructs an operation for fixing the cross table to the slider, and the height of the assembled structure as a whole increases.

In the linear motion rolling guide unit shown in FIGS. 18 and 19, a fixing reference surface of a table 13 is brought into contact with that C on the upper side of a slider 1, and the table 13 is fixed to the slider 1 by tightening screws 20 into fixing holes 51, so that an upper surface of a casing 5 is deformed to cause a distance between raceway grooves 9 (FIG. 25) in recesses 10 in the casing 5 to vary. When the distance between the raceway grooves 9 (FIG. 25) in the casing 5 in the linear motion rolling guide units, in which the slider 1 and track rail 2 are usually combined with each other under pressure in advance with no clearances left therebetween, the upper surface of the casing is recessed in the example of FIG. 18 to cause the clearances between the raceway grooves in the track rail and those in the casing to increase, and rattle to occur, and the upper surface of the casing 5 project in the example of FIG. 19 to cause the above-mentioned prepressure to increase, and the linear relative motion between the slider 1 and the track rail 2 to become dull. Therefore, smooth movements of the slider 1 cannot be made.

When the thickness of a table 13 to be fixed to a slider 1 is large, deep fixing holes 25 for inserting screws (fixing bolts) 20 thereinto have to be formed in the table 13 as shown in FIG. 20. The linear motion rolling guide unit shown in FIG. 20 constitutes an example in which combined tables 13, 34 are fixed to sliders 1. In this example, sliders 1 are provided on a pair of track rails 2, and tables 13, such as intermediate members are fixed to the casings 5 of the sliders 1 by screws 20, a table 34, such as a bracket being fixed to the tables 13 by the screws (fixing bolts) 33. In these combined tables 13, 34, the assembling procedure is limited as mentioned above.

In a conventional linear motion rolling guide unit, in which a track rail 2 is fixed to a side wall surface 37 of a mount base 14, such as a table via a slider 1 as shown in FIG. 21, the same problems as those in the example of FIG. 20 arise. Namely, it is necessary that deep fixing holes 25 be formed in the table 13, such as an intermediate member interposed between the slider 1 and mount base 14, and that a deep fixing holes 28 extending through the table 13 be formed so as to fix the table 13 to the mount base 14 by screws (fixing bolts) 33. Moreover, the casing 5 is not directly fixed to the mount base 14, and the intermediate member comprising the table 13 is required. This causes the number of parts to increase, the dimensions of a space needed to increase, the displacement of a part to occur when an impact is imparted to the rolling guide unit, an accumulated error to occur and the accuracy of the rolling guide unit to lower.

In a conventional linear motion rolling guide unit in which a track rail 2 is fixed to an upper surface 36 of a mount base 14, such as a table via a slider 1 as shown in FIG. 22, the same problems as those in the example shown in FIG. 20 also arise. Namely, it is necessary that deep fixing holes 25 be formed in the table 13, such as an intermediate member interposed between the slider 1 and mount base 14, and that a deep fixing holes 28 extending through the table 13 be formed so as to fix the table 13 to the mount base 14 by screws (fixing bolts) 33. Moreover, the casing 5 is not directly fixed to the mount base 14, and the intermediate member comprising the table 13 is required. This causes the number of parts to increase, the dimensions of a space needed to increase, the displacement of a part to occur when an impact is imparted to the rolling guide unit, an accumulated error to occur and the accuracy of the rolling guide unit to lower.

In an example shown in FIGS. 23 and 24, a track rail 2 is fixed to a side wall surface 37 of a mount base 14, and a mechanical part 39 is provided on the track rail 2 to permit linear relative motion therebetween, via a slider 1 which is moved linearly and relatively to the track rail 2. In order to form deep fixing holes 25 in the table 13, such as an intermediate member interposed between the slider 1 and mount base 14, and fix the mechanical part 39 to the table 13 by screws (fixing bolts) 33, it is necessary that a flange 48 be formed on the mechanical part 39, and that fixing holes 49 extending through the flange 48 be made. A support member 42 is fixed to a lower end of the mechanical part 39 via a support rod 41. Moreover, the mechanical part 39 is not directly fixed to the casing 5, an intermediate member comprising the table 13 being required in this example. This causes the number of parts to increase, the dimensions of a space needed to increase, the displacement of a part to occur when an impact is imparted to the rolling guide unit, an accumulated error to occur, and the accuracy of the rolling guide unit to lower.

SUMMARY OF THE INVENTION

An object of the present invention is to solve these problems, and provide a linear motion rolling guide unit capable of being applied to a miniaturized linear motion rolling guide unit incorporated into a semiconductor manufacturing apparatus, a transfer apparatus, an industrial robot, an assembly robot and a machine tool, provided on a casing which constitutes a slider with a flange integral with the casing, not using fixing holes which are formed in side portions of a casing in a conventional guide unit of this kind, and formed so that parts to be fixed to the guide unit, such as a table and a mount base can be fixed to the slider by utilizing the flange.

The present invention relates to a linear motion rolling guide unit provided with a track rail having raceway grooves in both of longitudinally extending side surfaces thereof; a slider saddled on and capable of being moved linearly and relatively to the track rail and comprising a casing having raceway grooves opposed to the above-mentioned raceway grooves, and end caps fixed to both end surfaces of the casing; and rolling elements rolling in raceways formed between the opposed raceway grooves, the casing having a flange integral therewith which extends from the surface of the casing which is on the opposite side of a raceway groove, the flange being provided on a side portion thereof with fixing reference surfaces with which fixing reference surfaces of a part to be fixed thereto are engaged, and in a reference surface-carrying portion thereof with fixing holes for use in securing the part to be fixed thereto to the mentioned portion of the flange.

This linear motion rolling guide unit has the above-described construction. Accordingly, even if a distance between the lower surface of a side portion of the slider and the outer surface of a mount base is short, the part to be fixed to the guide unit can be secured to the casing simply and easily.

In this linear motion rolling guide unit, the part to be fixed, such as a table is positioned on the fixing reference surfaces of the flange, and can be secured to the slider by inserting screws (fixing bolts) into the fixing holes. The variation of prepressure does not occur between the mount base and slider, and an accumulated error and the displacement of parts ascribed to an impact imparted to the guide unit do not occur. Therefore, it becomes possible to secure a strong fixing structure, assemble the guide unit with a high accuracy, and secure an accurate and reliable linear relative motion between the rail and the slider.

The casing and a part to be fixed thereto are secured to each other with the surface of the flange-carrying portion of the former contacting the upper or lower or side surface of the latter. Therefore, the degree of freedom of designing of a structure for securing the slider to the part to be fixed thereto increases, and this guide unit becomes able to be applied to various kinds of apparatuses.

The flange of the casing is fixed to an end surface of another slider saddled on and moved relatively to another track rail, the two track rails extending so as to cross each other, the resultant structure being able to be incorporated easily into an industrial robot.

The part to be fixed referred to above is a table fixed to the casing, and the table is fixed to the casing by screws, which are inserted into the fixing holes, with the fixing reference surfaces of the table and casing engaged with each other.

When the part to be fixed comprises the table to be secured to the casing, the table is secured to the casing by screws (fixing bolts), which are inserted into the fixing holes, with the fixing reference surfaces of the table and casing engaged with each other. This enables the table to be fixed to the slider firmly and easily with a high accuracy.

The flange portions of a pair of casings are attached to both of side surfaces of the table, and this table is supported on the track rails on which the casings are moved relatively thereto.

Another table is fixed to the table, whereby a combined table structure is formed.

The table comprises a cross table, on which another slider is fixed, and another track rail is incorporated into the additional slider so that this track rail can be moved relatively thereto.

The track rail is fixed to a side surface of the mount base, and the support member fixed to the flange of the casing moved on and relatively to the track rail extends downward.

In this linear motion rolling guide unit, the flange is formed on the casing integrally therewith, and the fixing reference surfaces with which the fixing reference surfaces of the part to be fixed to the guide unit are engaged are provided on the side surface of the flange, the fixing holes for use in securing the part to be fixed being provided in the reference surface-carrying portion of the flange. The providing of such reference surfaces and fixing holes only enables the table to be fixed to the casing directly without utilizing such fixing hole as are formed in a conventional casing, the number of parts to be reduced, and the forming of deep fixing holes in the table to be omitted even if the thickness of the table is large.

Although a screw tightening load is imparted to the flange of the casing of the slider, it is not to the portion between the raceway grooves in the casing. Therefore, the prepressure of the casing with respect to the track rail is not influenced by the load, and the linear relative motion characteristics of the slider are not adversely affected.

Moreover, since the table can be fixed contacting the right-angled surface comprising the surface of the casing which is on the opposite side of a raceway groove and the fixing reference surfaces of the flange, the table and casing are not displaced from each other even when they receive an external force.

The fixing reference surface may be provided on the side surface of the table which corresponds to the fixing reference surfaces of the flange. Accordingly, the forming of such a fixing reference surface on the table can be done easily, and the casing can be fixed to the table with a high accuracy.

DESCRIPTION OF THE PREFERRED EMBODIMENTS

Figure 1:
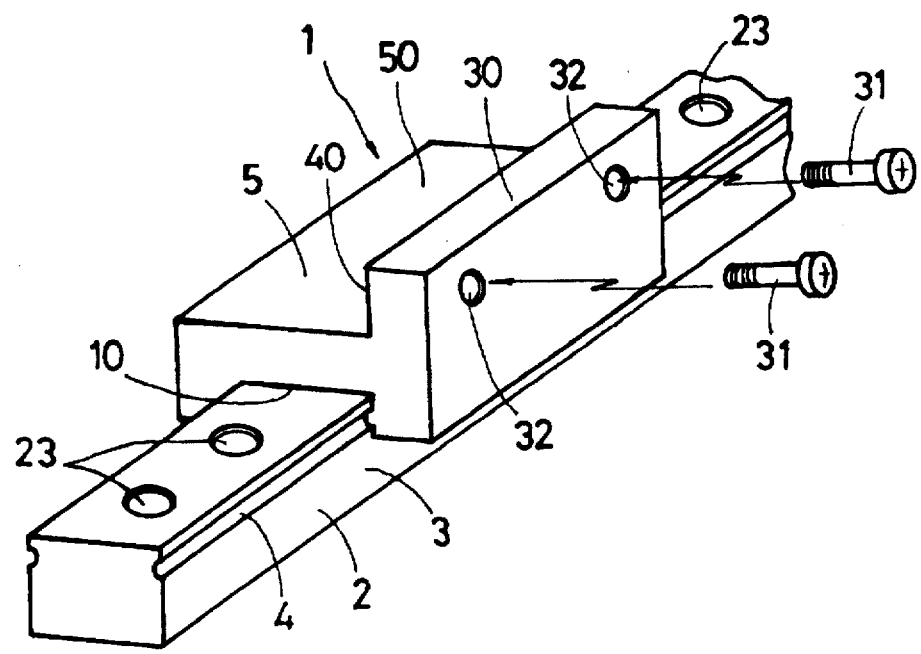
FIG. 1 is a perspective view showing an embodiment of the linear motion rolling guide unit.

The embodiments of the linear motion rolling guide unit according to the present invention will now be described with reference to the drawings. In the drawings illustrating the linear motion rolling guide unit according to the present invention, the parts identical with those shown in the drawings illustrating conventional examples of a linear motion rolling guide unit are designated by the same reference numerals. In each drawing showing the embodiments, the casing alone is illustrated with the end caps omitted from the slider of the linear motion rolling guide unit, so as to simply illustrate the slider.

Figure 2:
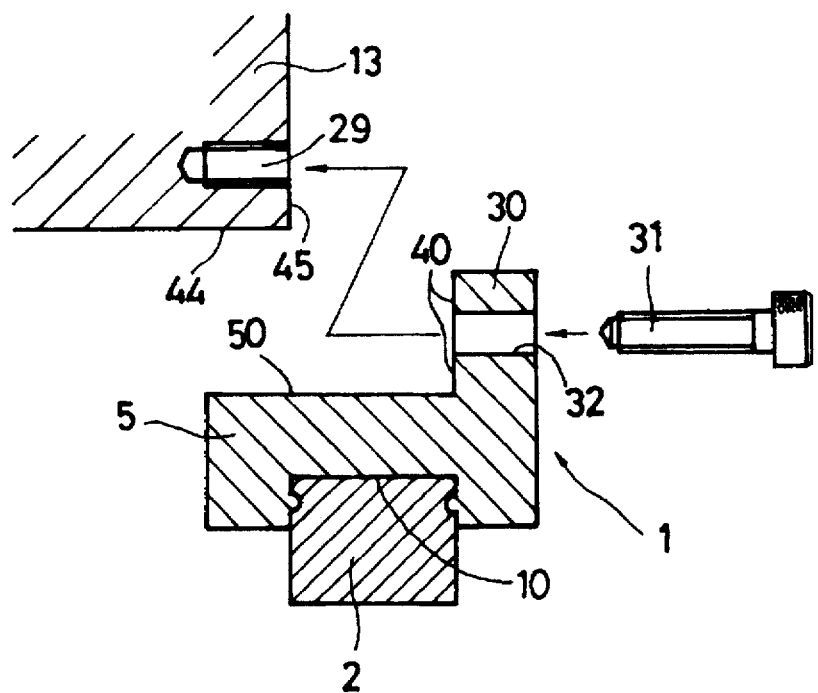
FIG. 2 is an exploded sectional view showing a first example of the condition of this linear motion rolling guide unit fixed to a table.
Figure 3:
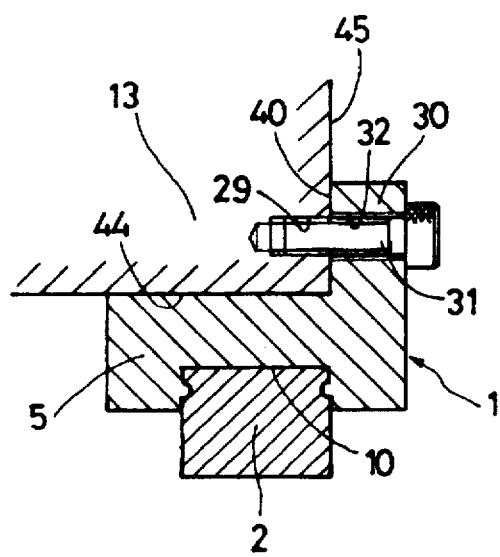
FIG. 3 is a sectional view showing the condition of the linear motion rolling guide unit of FIG. 2 fixed to a table.

A first embodiment of the linear motion rolling guide unit according to the present invention will now be described with reference to FIGS. 1, 2 and 3.

Figure 25:
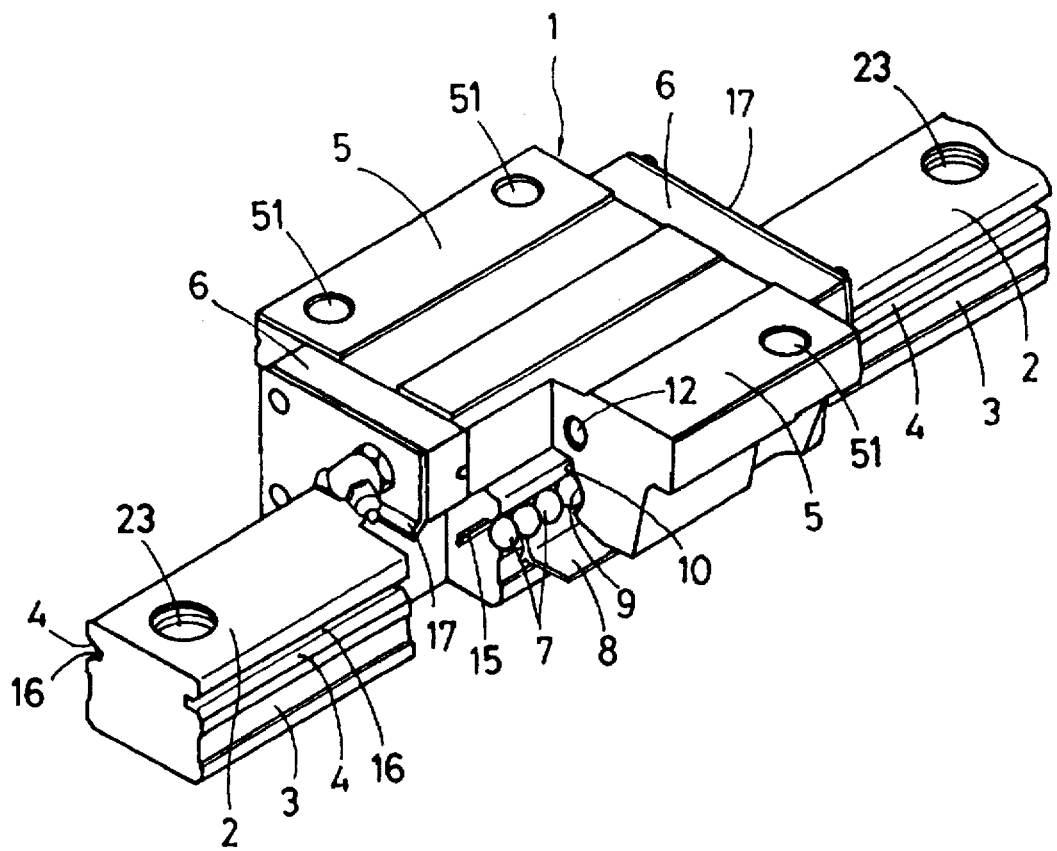
FIG. 25 is a partially cutaway schematic perspective view showing a conventional linear motion rolling guide unit.
Figure 26:
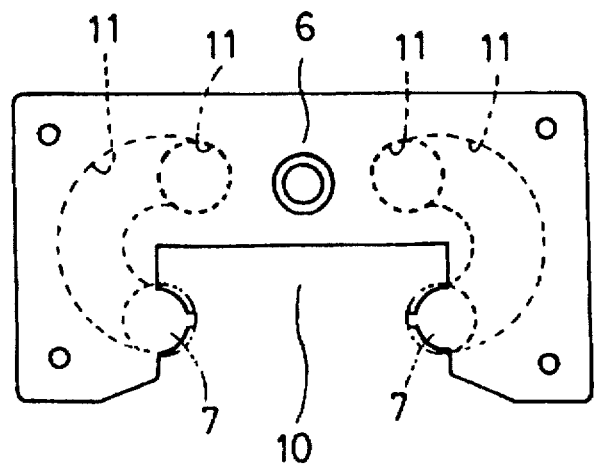
FIG. 26 is a front view of an end cap incorporated in the linear motion rolling guide unit of FIG. 25.

The linear motion rolling guide unit according to the present invention basically has the same construction except its flange as, for example, the linear motion rolling guide unit shown in FIG. 25. Since the linear motion rolling guide unit according to the present invention has the same construction as, for example, the linear motion rolling guide unit shown in FIG. 25, it will be described with reference to FIGS. 25 and 26 as well.

The linear motion rolling guide unit according to the present invention comprises a track rail 2 provided with raceway grooves 4 in both of its longitudinally extending side surfaces 3, and a slider 1 saddled on and capable of being moved linearly and relatively to the track rail 2. The slider 1 comprises a casing saddled on and capable of being moved linearly and relatively to the track rail 2 and provided with raceway grooves 9 in the portions thereof which are opposed to the raceway grooves 9, rolling elements 7 rolling in raceways formed between the opposed raceway grooves 4, 9, end caps 6 fixed to both of longitudinal ends of the casing 5, side seals 17 fixed to end surfaces of the end caps 6, and lower seals 8 provided on the slider 1.

The casing 5 is provided with return passages 12 in the portions thereof which are spaced from the raceway grooves 9. The end caps 6 are fixed to both of longitudinal end surfaces of the casing 5 by inserting screws into fixing holes made therein. Each of the end caps 6 is provided in both of inner side portions thereof with direction changing passages 11 which communicate with the raceway grooves 9 and return passages 12 to change the direction in which the rolling elements 7 circulatingly roll in raceways between the casing 5 and track rail 2. The end cap 6 has a recess 10, at which the end cap is saddled on the track rail 2, in the same manner as the casing 5. The rolling elements 7 roll circulatingly and limitlessly in the raceways in load regions formed between the raceway grooves 4, 9, and the direction changing passages 11 and return passages 12 in no-load regions. Retainer bands 15 are adapted to hold the rolling elements 7 in the raceway grooves 9 when the slider comprising a single body is saddled on and removed from the track rail 2.

This linear motion rolling guide unit constructed as described above is characterized, especially, in that a flange is provided on the casing 5. In this linear motion rolling guide unit, the casing 5 constituting the slider 1 is provided with a flange 30 formed integrally therewith and extending upward from the surface 50 (upper surface in the drawing) of the casing which is on the opposite side of the raceway groove formed in the recess 10. The flange 30 is provided on one side thereof with a fixing reference surface 40 with which a side surface 45 constituting a fixing reference surface of a part to be fixed, i.e. a table 13 is engaged, and in the wall thereof with fixing holes via which the table 13 is fixed to the flange 30.

An upper surface 50, on which the flange 30 is provided, of the casing 5 is engaged with a lower surface 44 of the table 13, whereby the casing 5 and table 13 are fixed to each other. The upper surface 50 of the casing 5 is not provided with such fixing holes 51 as are provided in a conventional casing. The table 13 is fixed to the casing 5 by bringing the fixing reference surface 45 of the former and that 40 of the flange provided on the latter into contact with each other, inserting screws (fixing bolts) 31 into fixing holes 32 in the flange 30, and twisting round these screws into threaded holes 29 in the table 13. Consequently, the casing 5 and table 13 are fixed to each other with the upper surface 50 of the former engaged with the lower surface 44 of the latter.

Therefore, in this linear motion rolling guide unit, a part to be fixed, such as the table 13 can be fixed directly to the casing 5 without utilizing such fixing holes 51 as are formed in a conventional casing 5. This enables the number of parts to be reduced, and the formation of deep fixing holes in the table 13 to be rendered unnecessary even when the thickness of the table 13 is large.

Although a tightening load of the screws 31 is imparted to the flange 30 provided on the casing 5 of the slider 1, it is not to the portion of the casing which is between the raceway grooves therein. The tightening load does not have influence upon the pre-pressure of the casing 5 against the track rail 2, nor does it adversely affect the linear relative motion characteristics of the casing 5.

The fixing reference surface 45 may be formed on the side of the table 13 which is opposed to the fixing reference surface 40 of the flange 30. The forming of the fixing reference surface 45 of the table 13 and that 40 of the flange 30 can done easily respectively, and the fixing of the casing 5 to the table 13 with a high accuracy.

Figure 4:
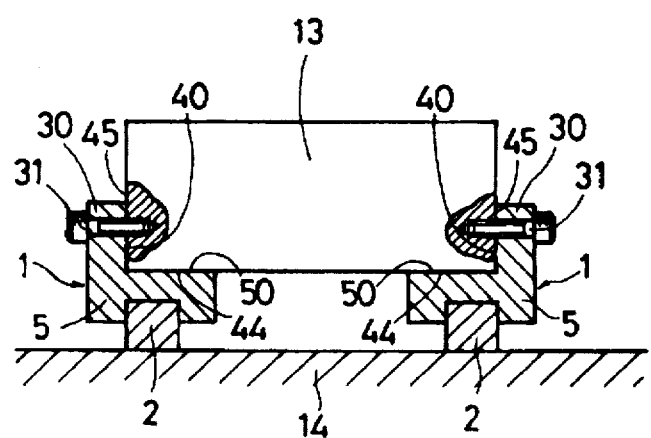
FIG. 4 is a sectional view showing a second example of the fixed condition of this linear motion rolling guide unit.

A second embodiment of this linear motion rolling guide unit will now be described with reference to FIG. 4. In the second embodiment, a pair of track rails 2 are set on a mount base 14. Sliders 1 are saddled on the track rails 2 so that the sliders 1 are moved linearly and relatively to the track rails 2. Flanges 30 of the two casings 5 are attached to both side surfaces 45 of the table 13 by screws (fixing bolts) 31. The table 13 is supported on the track rails 2 on which the casings 5 are moved relatively thereto. In this embodiment, deep fixing holes are not required to be formed in the table 13, and it is possible to determine easily the degree of parallelization of the two track rails 2 with respect to the table 13, and fix the track rails 2 to the mount base 14. Moreover, the operations, which are carried out in a conventional guide unit, for providing a stepped portion on the table and forming a fixing reference surface of the stepped portion are not required, and the side surfaces 45 of the table 13 may only be formed as the fixing reference surface. Therefore, the forming of the fixing reference surface on the table can be done easily.

Figure 5:
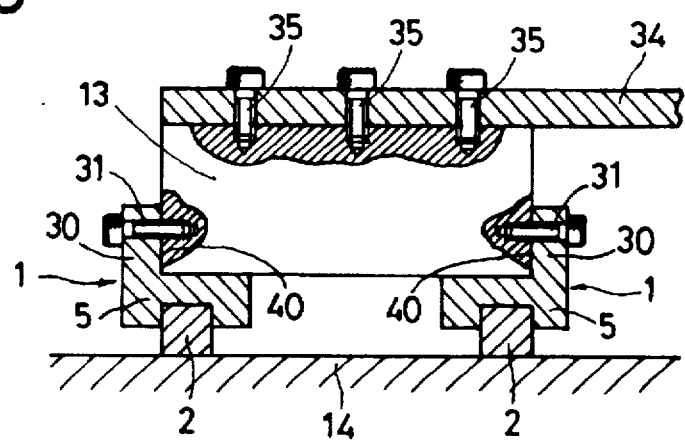
FIG. 5 is a sectional view showing a third example of the fixed condition of this linear motion rolling guide unit.

A third embodiment of this linear motion rolling guide unit will now be described with reference to FIG. 5. A table 13 has another table 34 fixed thereon, whereby a combined table is formed. The third embodiment is formed by fixing the table 34 comprising an additional bracket to an upper surface of the table 13 in the embodiment shown in FIG. 4, by screws (fixing bolts) 35.

Figure 6:
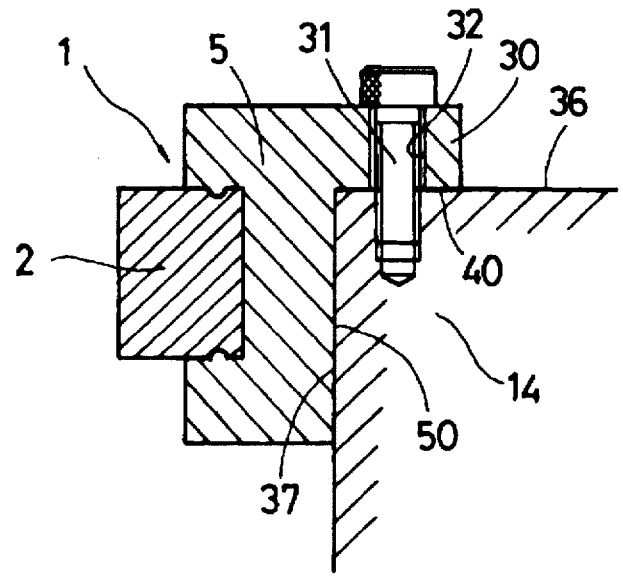
FIG. 6 is a sectional view showing a fourth example of the fixed condition of this linear motion rolling guide unit.

A fourth embodiment of this linear motion rolling guide unit will now be described with reference to FIG. 6. In the fourth embodiment, a casing 5 and a mount base 14 are fixed to each other with the surface 50 of the casing 5 on which a flange 30 is provided engaged with a side surface 37 of the mount base 14. The casing 5 is fixed to the mount base 14 by bringing an upper surface 36 constituting a fixing reference surface of the mount base 14 and a fixing reference surface 40 of the casing 5 into contact with each other, and inserting screws (fixing bolts) 31 into fixing holes 32 formed in the flange 30. Accordingly, in the fourth embodiment, the casing 5 constituting the slider 1 can be fixed directly to the mount base 14, and a track rail 2 can be moved linearly and relatively to the side surfaces 37 of the mount base 14 without requiring an intermediate member used in a conventional guide unit.

Figure 7:
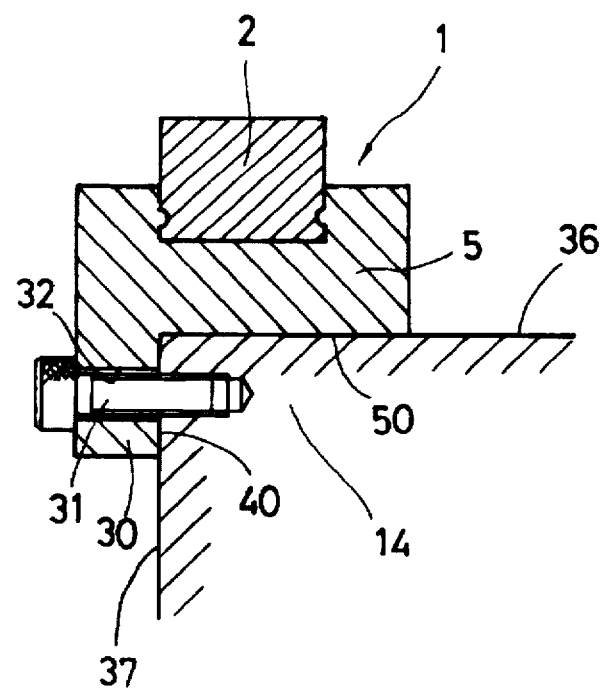
FIG. 7 is a sectional view showing a fifth example of the fixed condition of this linear motion rolling guide unit.

Another embodiment of the linear motion rolling guide unit will now be described with reference to FIG. 7. In the fifth embodiment, a casing 5 and a mount base 14 are fixed to each other with the surface 50 of the casing 5, on which a flange 30 is provided, contacting an upper surface 36 of the mount base 14. The casing 5 is fixed to the mount base 14 by screws (fixing bolts) 31 inserted through fixing holes 32 with a side surface 37 which constitutes a fixing reference surface of the mount base 14 and a fixing reference surface 40 of the casing 5 engaged with each other. Therefore, in the fifth embodiment, the casing 5 constituting the slider 1 can be fixed directly to the mount base 14, and a track rail 2 can be moved linearly and relatively to an upper surface 36 of the mount base 14 without requiring an intermediate member used in a conventional guide unit.

Figure 8:
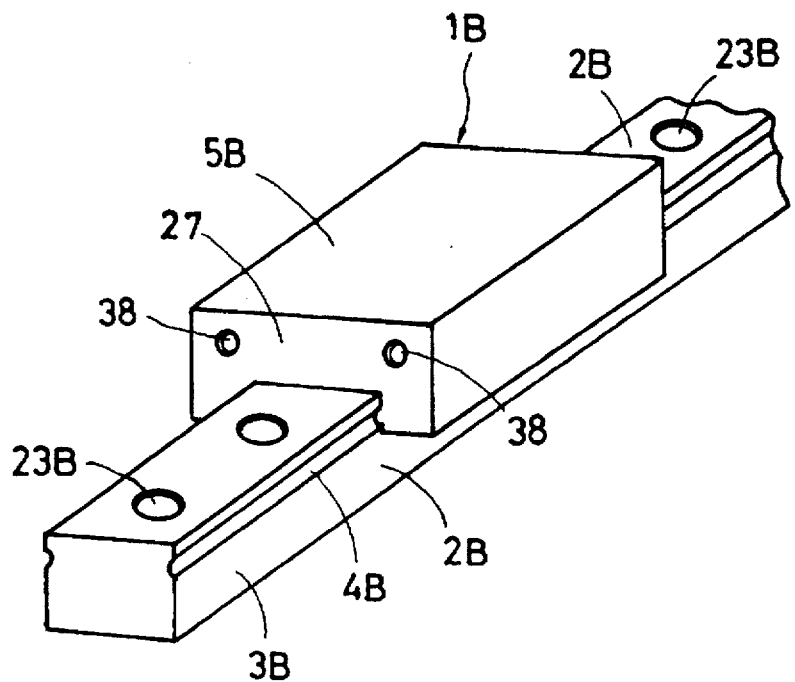
FIG. 8 is a perspective view of another linear motion rolling guide unit capable of being incorporated into this linear motion rolling guide unit.
Figure 9:
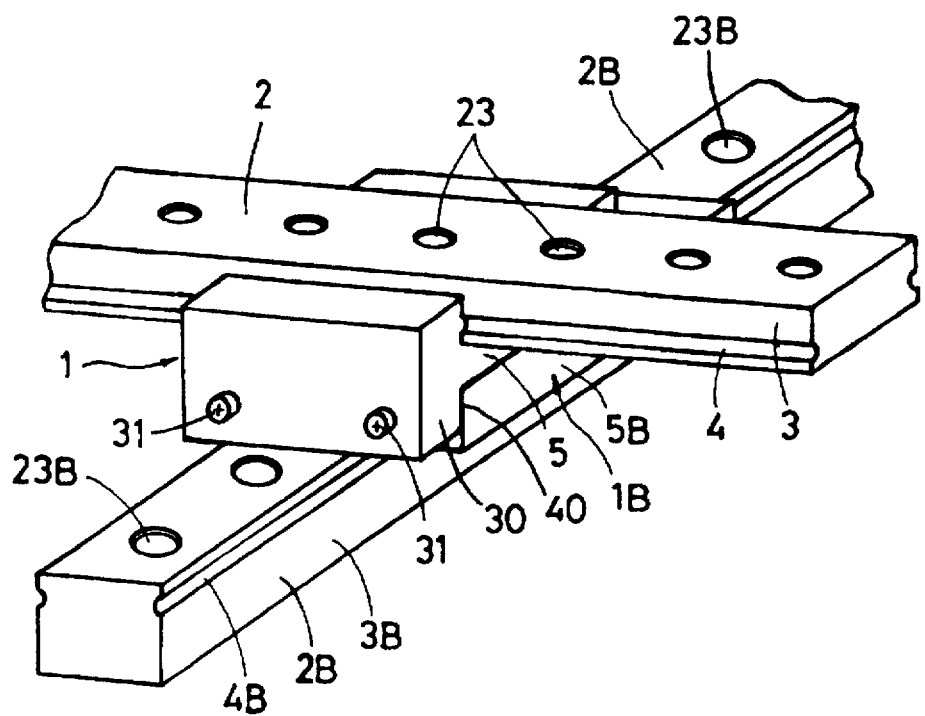
FIG. 9 is a perspective view showing a sixth example of the fixed the condition of the linear motion rolling guide unit of FIG. 1 to which the linear motion rolling guide unit of FIG. 8 is fixed.

A sixth embodiment of this linear motion rolling guide unit will now be described with reference to FIGS. 8 and 9. The sixth embodiment is a cross linear compound rolling guide unit in which track rails cross each other. A flange 30 of a casing 5 is fixed by screws (fixing bolts) 31 to an end surface 27 of a casing 5b constituting another slider which is saddled on and moved relatively to another track rail 2B, and the track rails 2, 2B extend so as to cross each other at right angles. The end surface 27 of the casing 5B constituting the slider is provided with threaded holes 38 into which the screws 31 are driven. In the sixth embodiment, the end surface 27 of the casing 5B constitutes a fixing reference surface, to which a fixing reference surface 40 of the flange 30 of the casing 5 is fixed in a contacting state. In this embodiment, the track rails 2, 2B are provided with fixing holes 23, 23B, and either the track rail 2 or the track rail 2B is fixed to the fixing mount, the other being able to be moved linearly along a two-dimensional plane.

Figure 10:
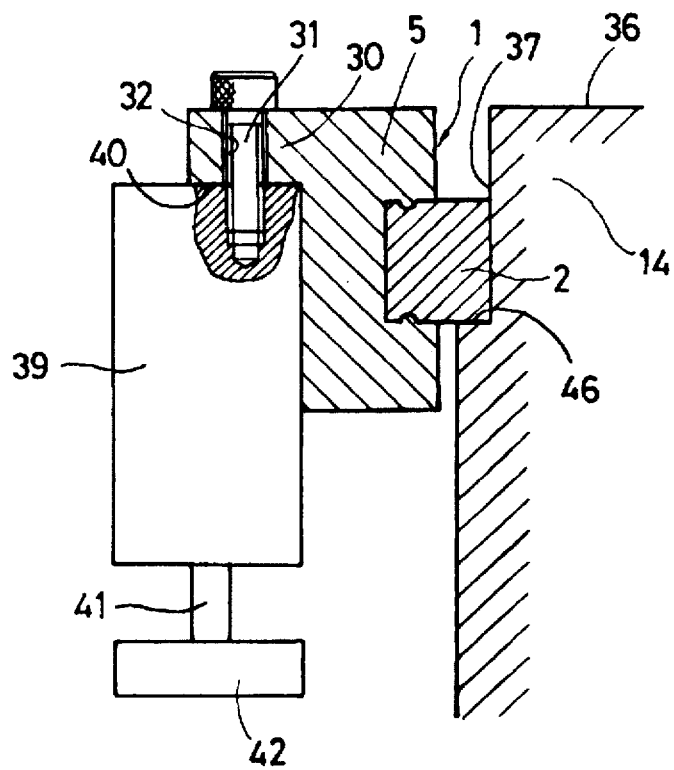
FIG. 10 is a schematic explanatory drawing showing a seventh example of the fixed condition of the linear motion rolling guide unit according to the present invention.
Figure 11:
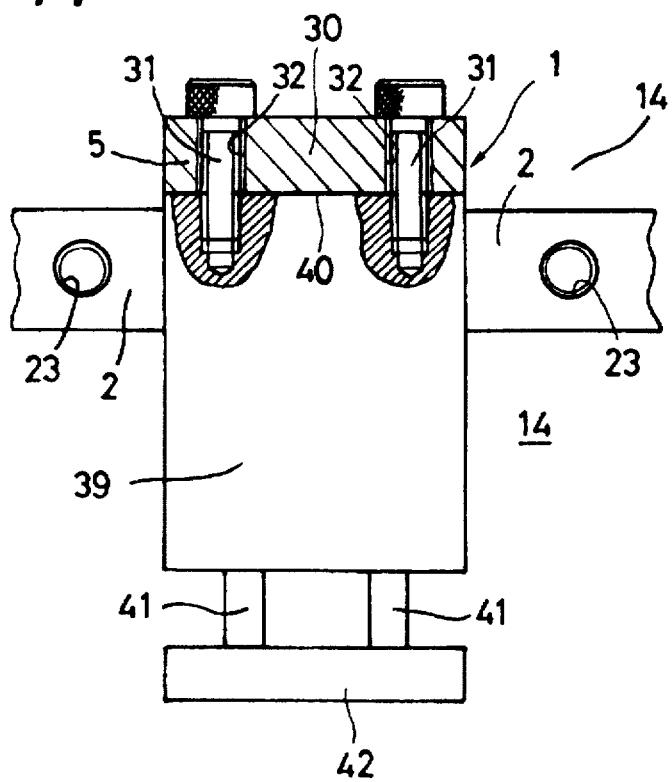
FIG. 11 is a side view of what is shown in FIG. 10.

A seventh embodiment of this linear motion rolling guide unit will now be described with reference to FIGS. 10 and 11. In the seventh embodiment, a track rail 2 is placed on a stepped portion 46 formed on a side surface 37 of a mount base 14, and fixed to the mount base 14 by screws. A support member 42 is fixed to a casing 5 of a slider 1 via a mechanical part, such as a cylinder, motor and a clamp. The mechanical part 39 to which the support member is joined is fixed by screws 31 to a flange 30 provided on the casing 5 of the slider 1 moving on and relatively to the track rail 2. The support member 42, such as a chuck, a clamp, a workpiece and a bit is fixed to the mechanical part 39 via support rods 41 so as to extend downward.

Figure 12:
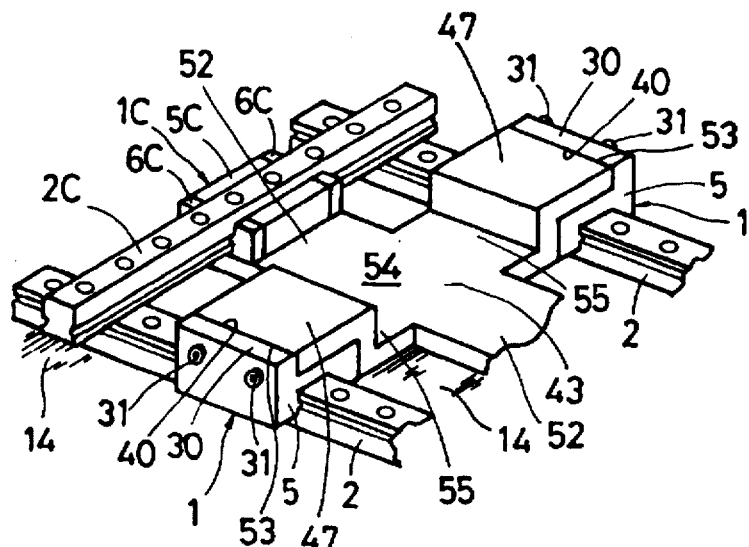
FIG. 12 is a partially cutaway schematic perspective view showing an eighth example of the fixed condition of the linear motion rolling guide unit according to the present invention.
Figure 13:
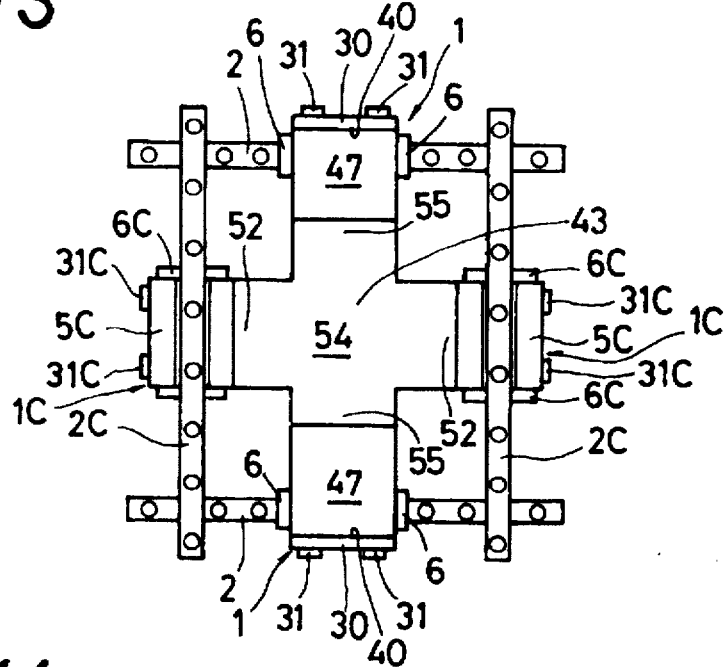
FIG. 13 is a plan view of what is shown in FIG. 12.
Figure 14:
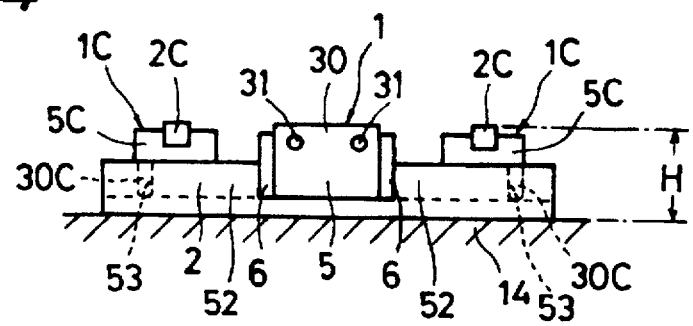
FIG. 14 is a side view of what is shown in FIG. 12.
Figure 15:
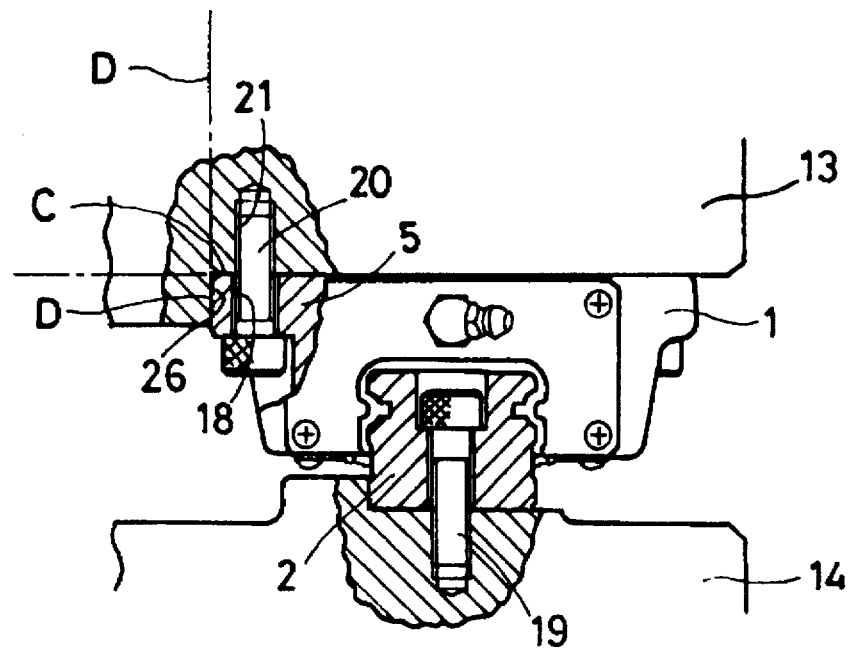
FIG. 15 is a partially sectioned explanatory drawing showing a conventional linear motion rolling guide unit.
Figure 16:
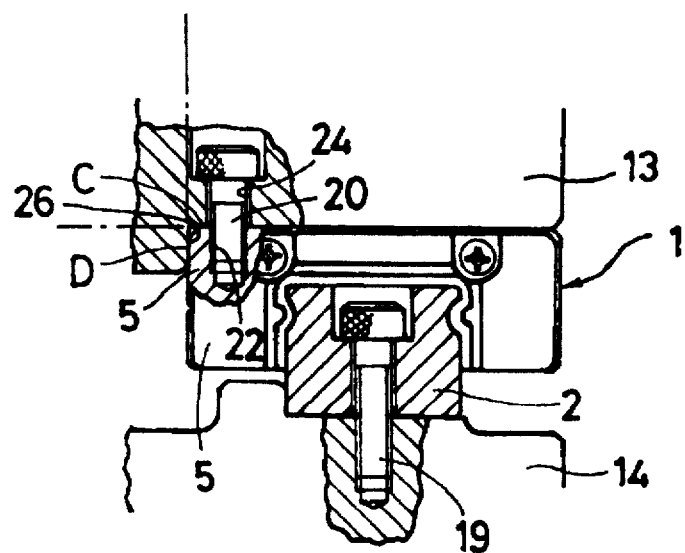
FIG. 16 is a partially sectioned explanatory drawing showing another conventional linear motion rolling guide unit.
Figure 17:
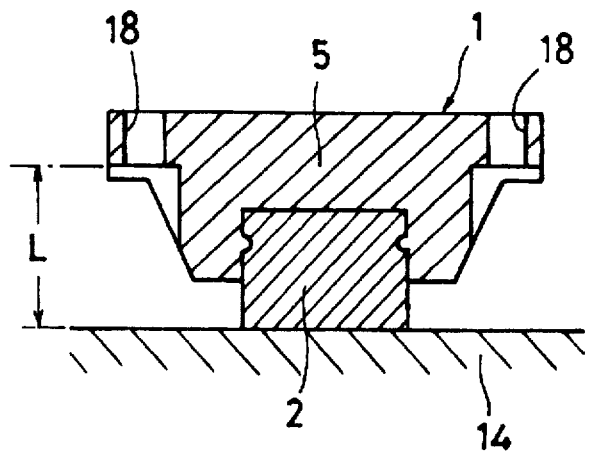
FIG. 17 is an explanatory drawing of a conventional linear motion rolling guide unit.
Figure 18:
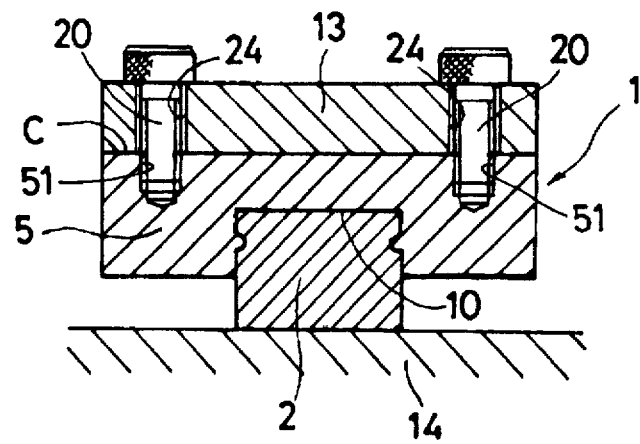
FIG. 18 is an explanatory drawing of still another conventional linear motion rolling guide unit.
Figure 19:
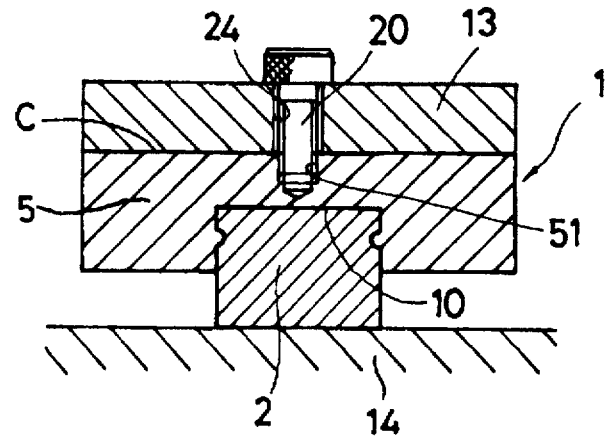
FIG. 19 is an explanatory drawing of a further conventional linear motion rolling guide unit.
Figure 20:
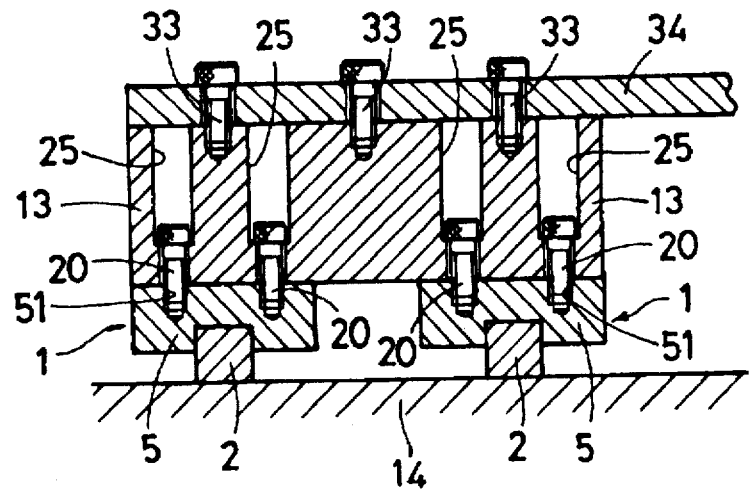
FIG. 20 is an explanatory drawing of another conventional linear motion rolling guide unit.
Figure 21:
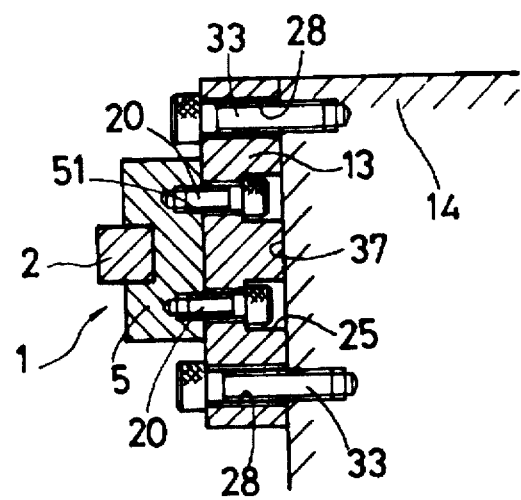
FIG. 21 is an explanatory drawing of still another conventional linear motion rolling guide unit.
Figure 22:
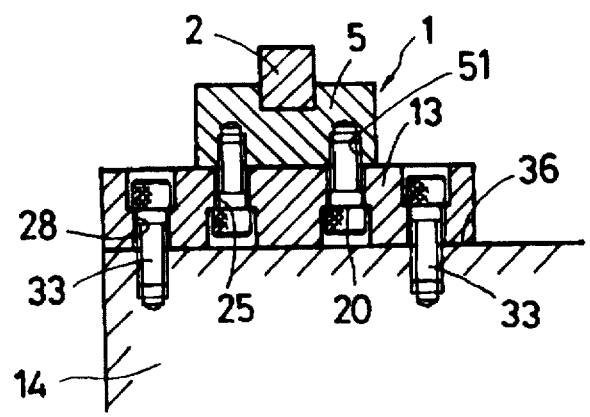
FIG. 22 is an explanatory drawing of another conventional linear motion rolling guide unit.
Figure 23:
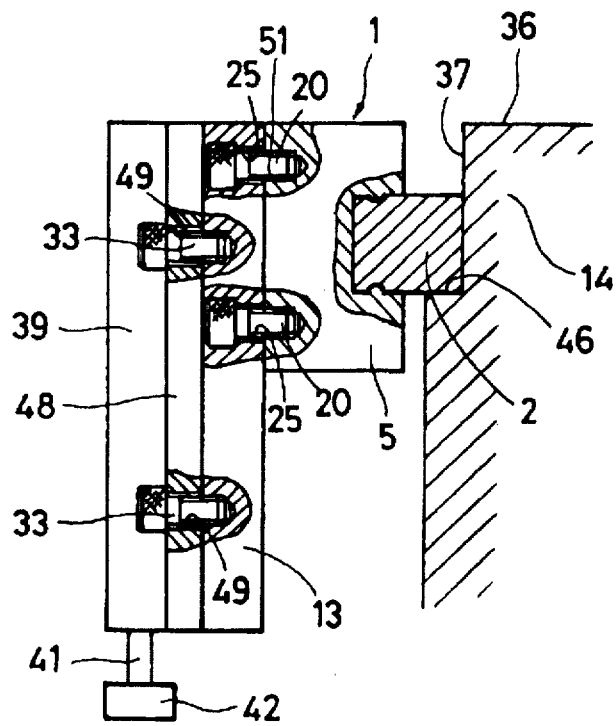
FIG. 23 is an explanatory drawing of a further conventional linear motion rolling guide unit.
Figure 24:
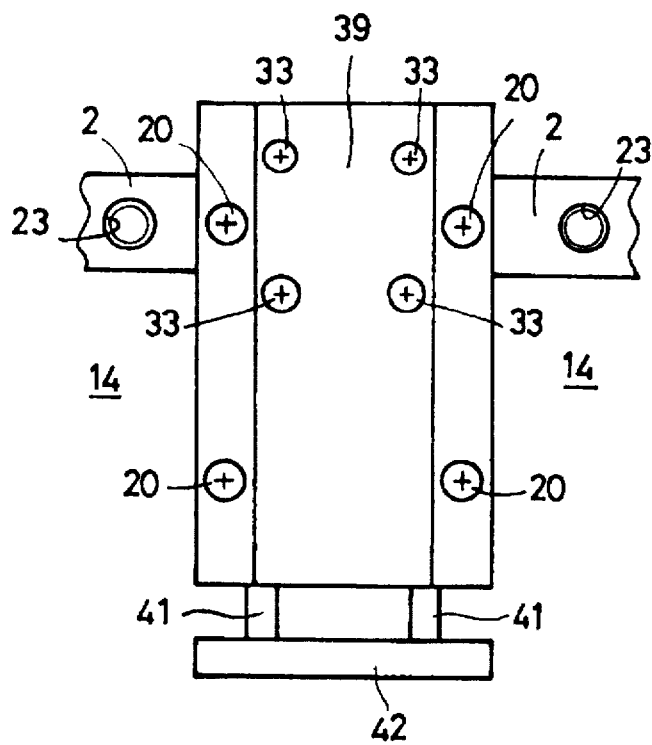
FIG. 24 is a side view of what is shown in FIG. 23.

An eighth embodiment of this linear motion rolling guide unit will now be described with reference to FIGS. 12, 13 and 14. In the eighth embodiment, a table comprises a cross table 43. A pair of track rails 2 are fixed on, for example, a mount base 14, and sliders 1 are saddled on and moved relatively to the track rails 2. The cross table comprises a central portion 54, and arms 55, 52 extending from the central portion 54 in the opposite directions. The arms 55 and arms 52 extend in the directions in which they cross each other. The arms 55 have at both end portions thereof shelves 47 formed by bending an upper surface thereof upward, while the arms 52 have at both end portions thereof straight extending flat regions, the end surfaces of the shelves 47 and flat regions having fixing reference surfaces 53.

A pair of sliders 1 are fixed to the shelves 47 of the arms 55, and a pair of sliders 1C to the flat regions of the arms 52. The shelves 47 are set on the upper surfaces of the relative casings 5, and fixing reference surfaces 40 of the flanges 30 provided on the casings 5 are engaged with those 53 of end surfaces of the shelves 47, the cross table 43 and casings 5 being fixed to each other by screws 31.

Casings 5C constituting the sliders 1C are fixed to end portions of the other arms 52 of the cross table 43, and track rails 2C are incorporated in the casings 5C so that they are moved relatively to each other. Namely, the fixing reference surfaces of the flanges 30C of the casings 5C are engaged with those 53 on the end surfaces of the flat regions of the arms 52 of the cross table 43, and the cross table 43 and casings 5C are fixed to each other by the screws 31C.

IN the eighth embodiment, a distance between opposed surfaces of the track rails 2, 2C is set small, whereby the height H of the surfaces of the track rails 2C with respect to the surface of the mount base 14 can be reduced to as great an extent as possible. The track rails 2 can be moved linearly along a two dimensional plane with respect to the track rails 2C.

What is claimed is:

1. A linear motion rolling guide unit comprising a first track rail provided with first raceway grooves in both of longitudinally extending side surfaces thereof; a slider which is saddled on and capable of being moved linearly and relatively to said first track rail, and which includes a casing provided with second raceway grooves opposed to said first raceway grooves, and end caps fixed to both end surfaces of said casing; rolling elements rolling in raceways formed between said first and second raceway grooves; a flange formed integrally with said casing so as to extend from the surface thereof which is on the opposite side of said second raceway grooves; a first fixing reference surface formed on a side surface of said flange; a part to be fixed which is provided with a second fixing reference surface engageable with said fixing reference surface of said flange; and fixing members for securing said part to be fixed to said flange.

2. A linear motion rolling guide unit according to claim 1, wherein said side surface of said flange extends perpendicularly to said surface of said casing.

3. A linear motion rolling guide unit according to claim 1, wherein said rolling elements comprise balls.

4. A linear motion rolling guide unit according to claim 1, wherein said casing and said part to be fixed are secured to each other with said surface on the flange-carrying side of said casing engaged with any one of upper, lower and side surfaces of said part.

5. A linear motion rolling guide unit according to claim 1, wherein said part to be fixed is a table to be fixed to said casing, said table being fixed to said casing with said fixing reference surfaces of said table and said casing engaged with each other.

6. A linear motion rolling guide unit according to claim 5, wherein flanges of a pair of casings are fixed to both side surfaces of said table, said table being supported on track rails on which said casings are disposed so that said casings can be moved relatively to said track rails.

7. A linear motion rolling guide unit according to claim 1, wherein said part to be fixed comprises a first table fixed to said casing, and a second table fixed to said first table, whereby said first and second tables are formed into a combined table structure.

8. A linear motion rolling guide unit according to claim 1, wherein said part to be fixed constitutes a second slider, which is saddled on and able to be moved linearly and relatively to a second track rail, which extends so as to cross said first track rail.

9. A linear motion rolling guide unit according to claim 1 comprising a mount base; said first track rail fixed to a side surface of said mount base and a support member fixed to said part to be fixed and extending downward along said mount base.

10. A linear motion rolling guide unit according to claim 1, wherein fixing holes are formed in a wall of said flange and said part is provided with threaded holes opposed to said fixing holes; and said fixing members for securing said part to be fixed to said flange being inserted into said fixing holes in said flange and driven into said threaded holes in said part to be fixed.

* * * * *